United States Patent [19]

Halter

[11] Patent Number: 5,312,570
[45] Date of Patent: May 17, 1994

[54] SYSTEM AND METHOD FOR PREPARING FIBER OPTIC RIBBONS

[75] Inventor: Roger F. Halter, Santa Ana, Calif.

[73] Assignee: Poly-Optical Products, Inc., Irvine, Calif.

[21] Appl. No.: 839,822

[22] Filed: Feb. 21, 1992

[51] Int. Cl.⁵ .................... B29C 59/04; G02B 6/00
[52] U.S. Cl. .................... 264/1.5; 264/1.6; 264/2.7; 264/162; 264/175; 264/284; 264/293; 385/901; 425/363; 425/385; 425/406; 425/367
[58] Field of Search ........... 264/1.5, 1.7, 2.7, 162, 264/293, 284, 175, 1.4; 83/102; 51/80 A, 150; 425/371, 385, 363, 406, 367; 385/901, 31, 33, 36, 114; 362/32; 65/1

[56] References Cited

U.S. PATENT DOCUMENTS

| | | | |
|---|---|---|---|
| 3,736,217 | 5/1973 | Nagao | 385/114 |
| 3,882,207 | 5/1975 | Hannan et al. | 264/1.7 |
| 4,096,010 | 6/1978 | Parham et al. | 83/102 |
| 4,271,104 | 6/1981 | Anderson et al. | 264/1.5 |
| 4,466,697 | 8/1984 | Daniel | 264/1.5 |
| 4,528,148 | 7/1985 | Dotti | 264/2.7 |
| 4,765,701 | 8/1988 | Cheslak | 385/901 |
| 4,871,487 | 10/1989 | Laursen et al. | 264/293 |
| 4,929,169 | 5/1990 | Fujigaki et al. | 264/162 |
| 4,929,599 | 5/1990 | Turk et al. | 264/2.7 |
| 5,136,480 | 8/1992 | Pristash et al. | 362/32 |

FOREIGN PATENT DOCUMENTS

| | | | |
|---|---|---|---|
| 62-192701 | 8/1987 | Japan | 385/901 |
| 63-293505 | 11/1988 | Japan | 385/901 |

*Primary Examiner*—Jan H. Silbaugh
*Assistant Examiner*—Mathieu Vargot
*Attorney, Agent, or Firm*—Robbins, Berliner and Carson

[57] ABSTRACT

A system and method for preparing an abraded fiber optic ribbon are provided. This system uses a flat abrasion panel containing a design, such as a company logo, and contacting it directly with a fiber optic ribbon, pressing devices to feed and press the panel and the fiber optic ribbon against each other as the design is being processed onto the fiber optic ribbon, and adjustable speed and differential pressure devices are used to drive the pressing devices. In addition, at least one of the pressing devices may be heated to enhance the processing of the pattern onto the fiber optic ribbon. Particularly, the pressing includes a first roller and a second roller defining a nip through which the panel and the fiber optic ribbon are being fed and pressed against each other. Alternatively, the pressing includes a first plate and a second plate defining a pressing zone in which the panel and the fiber optic ribbon are being fed and pressed against each other. Further, shimstock of variable thickness or wedge with a constant sloping thickness attached to a supporting pad can be used between the panel and the fiber optic ribbon in a press plate system to obtain a predetermined pattern along a length of the fiber optic ribbon due to differential pressure or uniform differential pressure respectively, being applied to the length of the fiber optic ribbon.

30 Claims, 6 Drawing Sheets

SYSTEM AND METHOD FOR PREPARING FIBER OPTIC RIBBONS

FIELD OF THE INVENTION

The present invention relates to a system and method for preparing fiber optic ribbons using abrasion selection panels. Specifically, this system for abraded fiber optic ribbons comprises a flat abrasion selection panel for abrading all or part of a fiber optic ribbon in a pattern or design, such as specific locations for key pad buttons or a company logo, a fiber optic ribbon on a substrate in direct contact with the panel, a first roller and a second roller defining a nip through which the panel and fiber optic ribbon are fed and pressed against each other as the design is pressed onto the fiber optic ribbon and means for driving at least one of the rollers as to feed the panel and the fiber optic ribbon. Alternatively, the panel and fiber optic ribbon may be pressed together between flat plates.

More specific objects and advantages of the invention will hereinafter be made clear or become apparent to those skilled in the art during the course of explanation of preferred embodiments of the invention.

BACKGROUND OF THE INVENTION

Fiber optic ribbons are comprised of an array of multiple optical fibers grouped together in any size in a ribbon and secured to a substrate. Typically, the ribbon is about 0.01 to 0.03 inches thick. If one or more surfaces of the ribbon are marred or abraded and a light source is applied to one end of the marred ribbon, light will be emitted from the marred area. Accordingly, efforts have been made to create a specific illumination pattern which can be effectively used to backlight a variety of displays. For example, stamping the ribbon with a roughened plate was used to provide marring of fiber optic ribbons. In this approach, a ribbon would be placed on a cushion and a stamp having a covering, such as emery paper, would be pressed against the ribbon to deform or mar the surface. To increase the amount of surface marring along the ribbon, the cushion was placed on a plate having a particular profile, such as an uprising surface or a symmetrical curved plate. For further details, see U.S. Pat. No. 4,929,169 to Fujigaki et al. entitled "Working Equipment For Roughing The Side of Optical Fiber".

The stamping method can only mar a fixed length of ribbon at a time limited by the size of the stamp. Different sized stamps thus are required to mar different length of ribbons. As such, different forces need to be applied in order to achieve the same desired pressure profile against the cushion and plate. These cumbersome limitations severely restrict the stamping method to produce a desired marring pattern only along a short portion of the ribbon. In addition, the plates on the apparatus need to be changed, a cumbersome and time-consuming procedure, whenever a different marring size is desired. Presently, different patterns are not possible.

An improved method and apparatus for marring the surface of a fiber optic ribbon over the stamping method has been disclosed in pending U.S. application Ser. No. 07/785,130 entitled "Method And Apparatus For Marring Fiber Optic Ribbons", (hereinafter known as the nip method) also assigned to the assignee of the present invention, Poly-Optical Products, Inc., reference to which is being hereby incorporated by reference.

In this nip method, the fiber optic ribbon is being fed between a pair of rotating rollers. One of the roller is coated with an abrasive. The second roller may be hard, have a deformable cover or also have an abrasive coating. Alternatively, one or both rollers may be serrated to produce a ripple pattern in the fiber optic ribbon. This nip method using an abrasive coating on the roller(s) for marring the surface of a fiber optic ribbon has a number of advantages over the earlier stamping method.

For example, because surface marring occurs as the fiber optic ribbon is fed through the gap between the rollers, less force is required to mar the fiber optic ribbon than in the earlier stamping method. The nip or contact pressure line between the rollers is easier to control and accurately maintain than pressure developed across a stamping plate. A further advantage of the nip apparatus and method is that various marring patterns may be created on the ribbon surface by adjusting the speed of the ribbon through the nip and/or altering the pressure in the nip as the ribbon moves therethrough and/or creating a pressure differential along the nip or contact pressure line between the rollers. In other words, most any illumination profile along the surface of the ribbon is possible. Despite its improvements over the earlier stamping method, the nip method is limited. The nip method is limited because the light output is limited by the uniform abrasive coating on the roller(s) rendering it extremely difficult to provide high light output to specific areas as is required to back light a company logo design display. In addition, the nip method is cumbersome because the gap in the nip needs to be adjusted during processing to achieve a gradual differentiation of surface marring along the ribbon. Moreover, the nip method often introduces a "seam" that is transferred onto the ribbon from the roller when the abrasive coating on the roller(s) is used. This seam causes a break in the pattern being marred onto the ribbon and leads to flaws in back lighting of the display.

Therefore, a need has developed for a system and method that permit processing a specific design onto a fiber optic ribbon having different lengths of abrasion or that require different display patterns without interrupting operation of the system to substitute suitable parts. It is also desirable that such a system be capable of gradually and accurately altering the pressure profile applied to the ribbon, again without interrupting operation of the system.

SUMMARY OF THE INVENTION

Accordingly, the present invention provides a system and method that can process specific designs onto a fiber optic ribbon with minimal hard tooling costs.

It is another object of the present invention to provide such a system and method that can produce several variations of size and shape on a fiber optic ribbon in a single run with no tooling changes.

It is another object of the present invention to provide such a system and method which can create a specific pattern of up to two feet on a fiber optic ribbon with quality superior to conventional stamping methods.

Another object of the present invention is to provide such a system and method to create a specific pattern on a fiber optic ribbon which can deliver higher intensity of light to specific areas where needed without the use of a diffuser.

Another object of the present invention is to provide such a system and method, the use of which is characterized by speed, convenience, flexibility and economy of manufacturing.

It is yet another object of the invention to provide such a system and method which is of a relatively simple construction and permits relatively flexible and large specific patterns to be processed onto the surface of a fiber optic ribbon.

Other objects and advantages of the invention will become apparent from the following detailed disclosure.

In accordance with the present invention, a system for preparing fiber optic ribbon is provided which comprises a flat abrasive selection panel containing a design or pattern, such as a company logo; a fiber optic ribbon in direct contact with the panel; pressing means to feed and press the panel and fiber optic ribbon against each other as the design is being processed onto the fiber optic ribbon; and driving means for driving the pressing means to feed and press the panel and the fiber optic ribbon. Particularly, the pressing means comprises a first roller and a second roller defining a nip through which the panel and the fiber optic ribbon are being fed and pressed against each other. More particularly, the driving means comprises a motor for driving at least one of the rollers.

Alternatively, the pressing means comprises a first plate and a second plate defining a pressing zone in which the panel and the fiber optic ribbon are being fed and pressed against each other. Particularly, the driving means comprises a motor for driving at least one of the plates.

In addition, a method for preparing fiber optic ribbon comprises the steps of: preparing an abrasion selection panel containing a design; directly contacting the panel with a fiber optic ribbon; feeding and pressing the panel and the fiber optic ribbon together through or in a pressing means as the design is being pressed onto the fiber optic ribbon; driving the pressing means to feed the panel and the ribbon; and separating the panel from the fiber optic ribbon after the design has been pressed onto the fiber optic ribbon.

BRIEF DESCRIPTION OF THE DRAWINGS

The novel features which are believed to be characteristic of the invention are set forth with particularity in the appended claims. The invention itself, however, both as to its organization and method of operation, may best be understood by reference to the following description, taken in connection with the accompanying drawings, wherein similar characters refer to similar elements throughout and in which:

DESCRIPTION OF THE PREFERRED EMBODIMENT

A system for preparing abrasion selection panels embodying the features of the present invention is shown in FIGS. 3-12.

Figure 1:
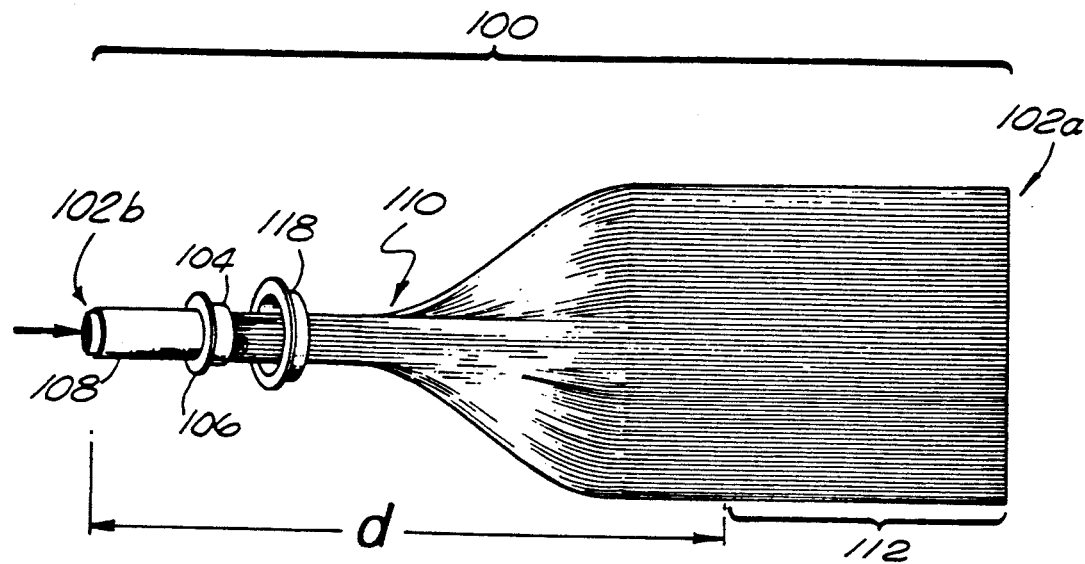
FIG. 1 is an elevational view of a fiber optic assembly used in the present invention.

Referring now to FIG. 1, the fiber optic assembly 100 has a front end 102a and a rear end 102b. At the rear end 102b, a plastic tube 108 is used to enclose and provide support for a group of optic fibers 110. A metal sleeve or pincher 104 with an enlarged anterior end 106 in the shape of a washer is used to crimp the plastic tube 108 tight around the group of optic fibers 110. As the optic fibers emerge from the posterior end of the plastic tube, they diverge from the center of the tube and form a parallel pattern or ribbon 112 when the optic fibers are at a distance d measured from the rear end 102b of the optic fiber assembly 100. The optic fiber ribbon 112 begins with the start of this parallel pattern and comprises parallel optic fibers adhered to a plastic, generally reflective, backing 116 by adhesive (not shown). A plastic female connector 118 is used to connect the rear end of the fiber optic assembly to a light source (not shown). This provides a tight light seal as the connector is pressed against the enlarged anterior end 106 of the metal pincher 104 after assembly to ensure the light from the source will only escape through the optic fibers. Although the exemplary embodiment of the fiber optic ribbon disclosed herein are in a parallel pattern, the fiber optic ribbon may be made in any pattern or shape or size up to 2 feet. In addition, the optic fibers may be in many layers and different colors may be added to enhance the contrast of the display.

Figure 2:
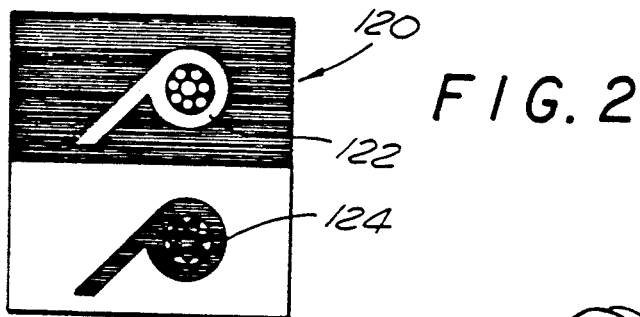
FIG. 2 is an elevational view of a flat abrasion selection panel containing a design pattern.

Referring now to FIG. 2, a flat abrasion selection panel 120 with a positive 124 and negative 122 patterns in the design are shown. The flat abrasive panel used in the present invention may be prepared by any conventional method. For example, a laser engraver machine may be used to cut out a precision pattern which is then adhered by adhesive to a thin substrate (not shown) for support. In the situation in which a negative pattern is engraved, the adhesive and thin substrates may not be required for support. In the preferred embodiment, a pattern engraved using the laser is prepared on emery paper, but other conventional substrate may be used to facilitate the marring effect. Other methods for preparing the abrasion selection panel include emery paper that is cut by a steel rule die, scissors, razor blades or any other practical means. Also, an abrasive layer may be selectively built up on the substrate rather than cut out, such as by adding layers of diamond dust on top of adhesive.

Figure 3:
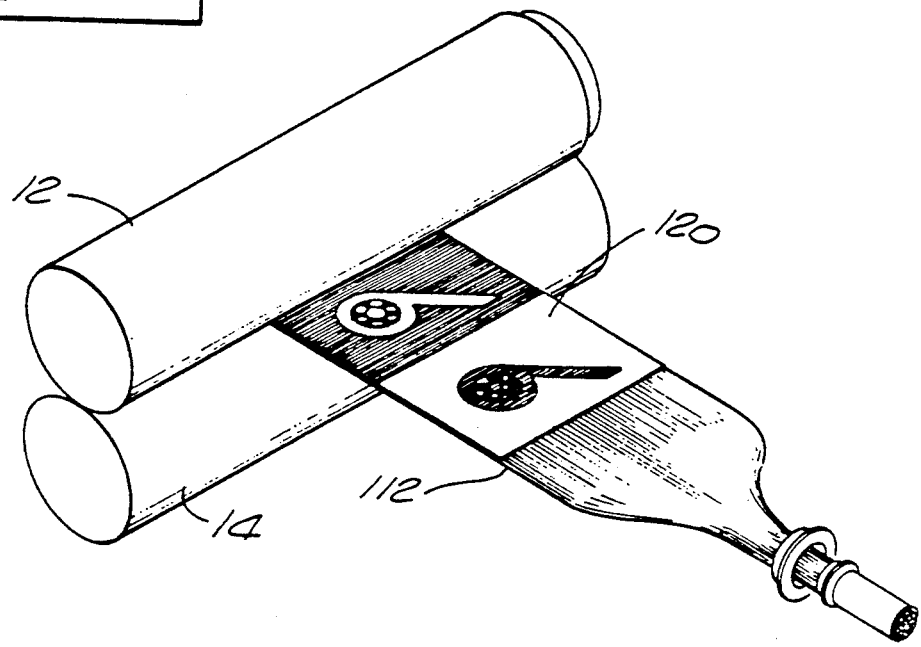
FIG. 3 is a perspective side-view of a system for preparing abrasion fiber optic ribbons constructed in accordance with the present invention.
Figure 4:
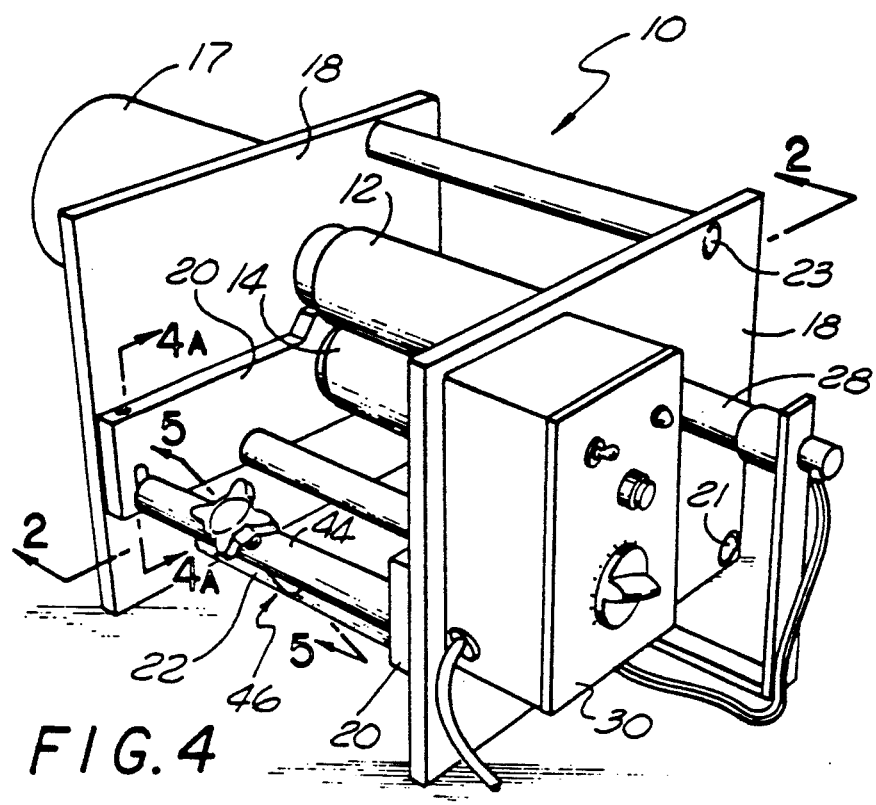
FIG. 4 is a perspective view of the complete roller system used to feed and process the design from the flat abrasion panel onto the fiber optic ribbon.

As shown in FIG. 3, after the flat abrasion selection panel 120 with the specific pattern has been prepared, it is then placed in direct contact with the fiber optic ribbon 112. The panel 120 and the fiber optic ribbon 112 are then feed through a first 12 and a second rollers 14 which define a nip. As shown in FIG. 4, the complete roller system 140 includes the first(top) roller 12, the second (bottom) roller 14, side plates 18 and rocker arms 20. The side plates 18 are secured to a plurality of connecting rods 21, 22, and 23 that extend between the side plates 18 for lateral support.

The first roller 12 may be made from low carbon, hot rolled bar, A-36 steel. To enhance the processing of the pattern from the abrasion selection panel onto the fiber optic ribbon, one or both of the rollers may be heated. A bore 15 extends through the first roller 12 is used for receiving a conventional heating element from a conventional heater 30. Preferably, the heater 30 is sufficient to heat the top roller 12 to about 200 degree F. The first roller 12 is mounted to the side supports 16 and is driven by motor 17. Preferably, the motor is an adjustable speed DC motor. Alternatively, the roller may be operated manually, as by a handcrank (not shown). The surface 26 of the first roller is smooth, or preferably, cover with a smooth protective coating.

The second roller 14 may be made from low carbon-free machining steel. The second roller 14 has a shaft 16 that is mounted to rocker arms 20 (see FIG. 6). The shaft 16 may, if desired, extend through openings 19 of the side plates 18 to be operatively engaged to a second motor (not shown). The openings 19 are larger in diameter than the shaft of the second roller 14 to permit the second roller 14 to move closer to or farther from the first roller 12. It is noted that the motor 17 for the first roller may be used to drive the second roller e.g., by the frictional forces between the rollers or by meshing gears between the rollers. Alternatively, only the second roller 14 may be driven. In the preferred embodiment, the second roller is also provided with a deformable covering 24, such as rubber or polyurethane, having 90±3 Durometer, shore A.

A nip or contact pressure line 40 is defined between the first roller 12 and the bottom roller 14. A length of flat abrasion selection panel placed over a length of fiber optic ribbon A, passes through the nip 40 in the direction of the arrow (see FIG. 5). The direction of the arrow may also be reversed to permit the same abrasion selection panel and ribbon to pass back and forth through the nip. A horizontally disposed piece of sheet metal (not shown) may be secured between the side plates 18 and used to support the panel and fiber optic ribbon as it passes through the nip 40. A second piece of sheet metal may be used to support the panel and fiber optic ribbon as it passes out from the nip. A clear plastic safety shield (not shown) may also be placed in front of and over the top roller to prevent an operator from getting his or her fingers caught in the nip.

Figure 5:
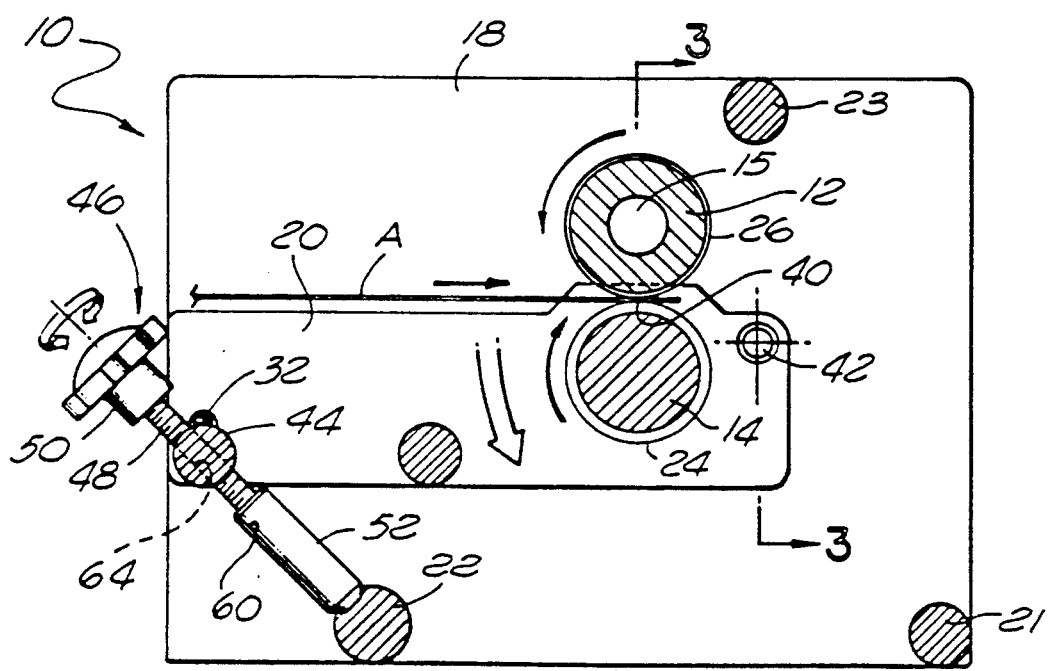
FIG. 5 is a cross-sectional side elevational view of the complete roller system taken along line 2—2 of FIG. 4.
Figure 6:
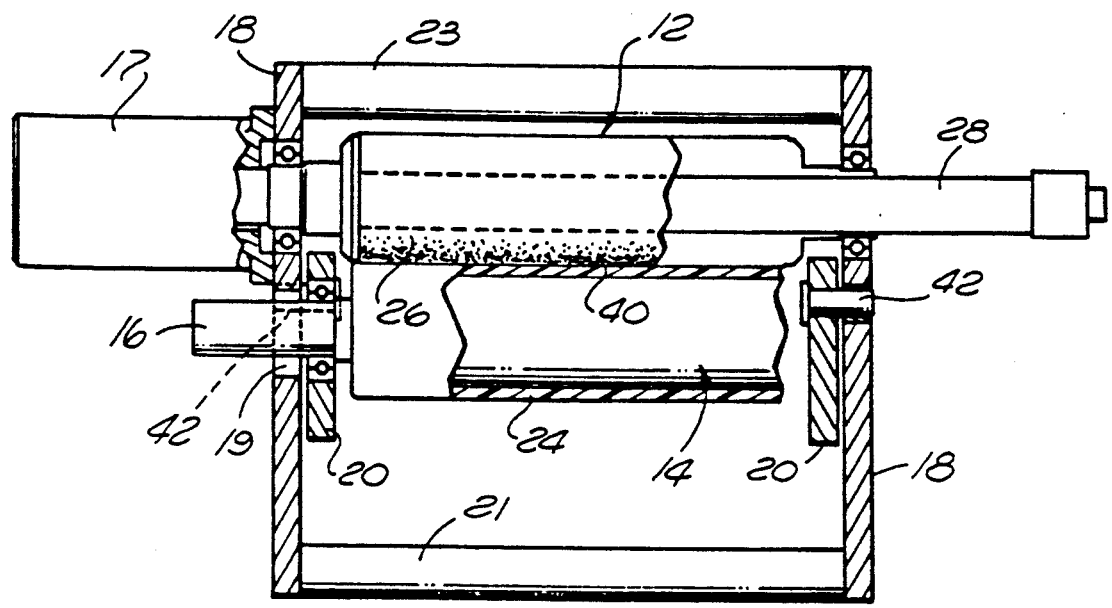
FIG. 6 is a cross-sectional front view taken along line 4A—4A of FIG. 4 and a cross-sectional front elevational view of the complete roller system taken along line 3—3 of FIG. 5.

Referring to FIGS. 5 and 6, the rocker arms 20 are rotatably mounted to pivot rods 42 which cantilever out from and are supported by the side plates 18. Preferably, the pivot rods 42 are secured to the rocker arms 20 adjacent the bottom roller 14 and below the nip 40.

Pressure in the nip may be adjusted through the use of a screw mechanism 46 which acts upon a bar 44 mounted to and extending between the rocker arms 20. Preferably, the bar 44 is secured to the rocker arms at a sufficient distance from the nip to act as a lever when the bar 44 is moved upwardly to increase pressure in the nip.

Figure 7A:
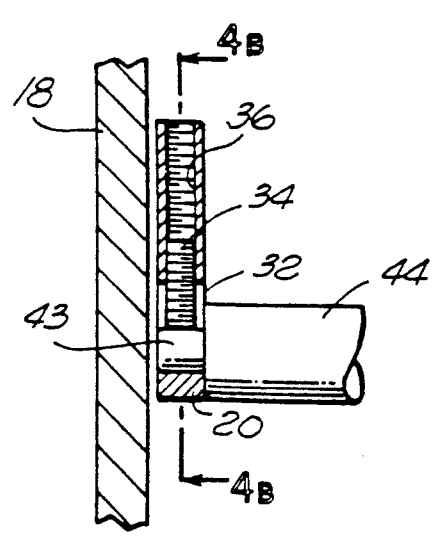
FIGS. 7A and 7B are a cross-sectional front view taken along line 4A—4A of FIG. 4 and a cross-sectional side view taken along line 4B—4B of FIG. 7A, respectively, of means for adjusting the height of the bar disposed through the slot in the rocker arm of the complete roller system.
Figure 7B:
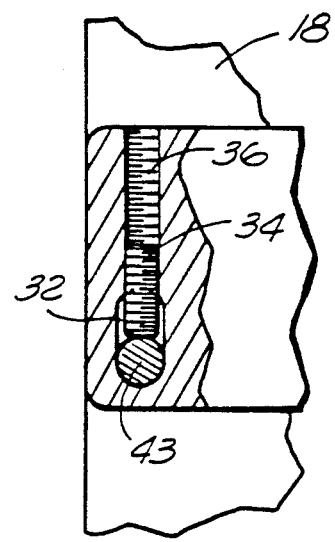

In the preferred embodiment, an extension 43 of the bar 44 is received in a slot 32 of each rocker arm 20 (see FIGS. 7A and 7B). Each rocker arm also has a vertical bore 34 for receiving an adjustable screw 36 for setting an upper limit to which each extension 43 of bar 44 may move in the slot 32 during application of pressure to the nip. In other words, the height of each end of the bar 44 may be separately adjusted to insure that uniform pressure will be applied in the nip along the length of the rollers. Alternatively, the adjustable screws 36 may be set such that pressure in the nip will increase or decrease along the length of the rollers. This would be beneficial if it was desired to insert a panel/fiber optic ribbon lengthwise into the nip.

Figures 8A, 8B:
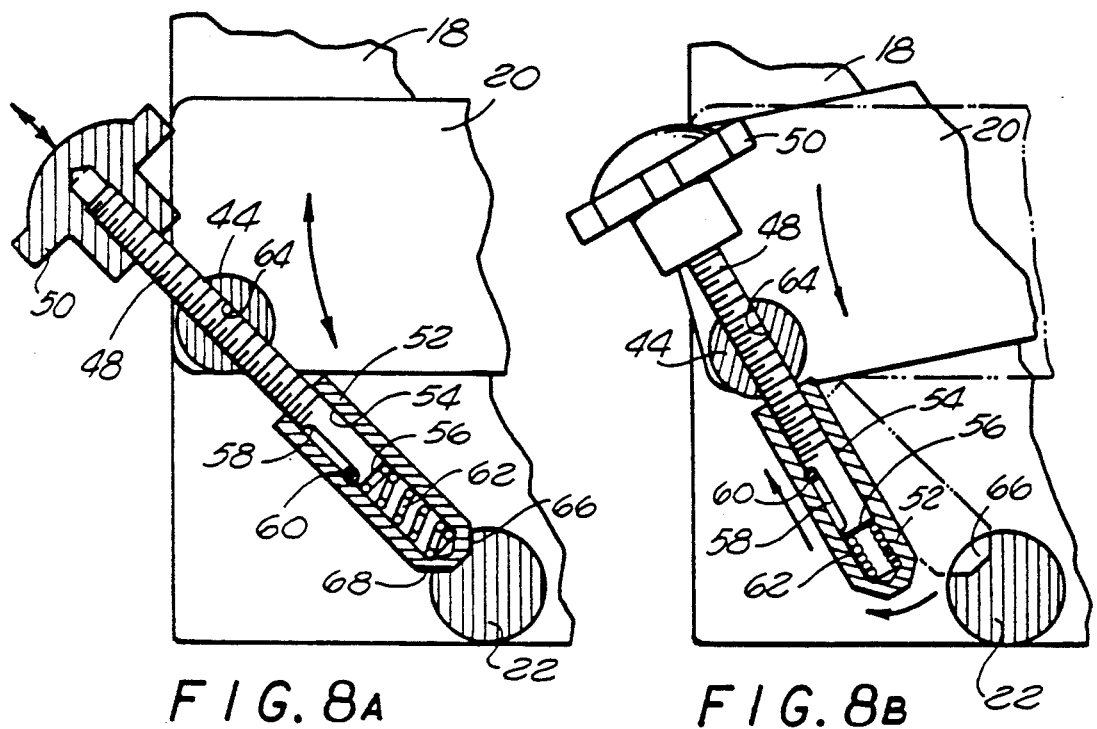
FIGS. 8A and 8B are cross-sectional side views taken along line 5—5 of FIG. 4, of the screwing mechanism in an engaged position and a disengaged position, respectively.

The screw mechanism 46 includes a threaded shaft 48, a knob 50 and a sleeve 52. Referring to FIGS. 8A and 8B, the sleeve 52 has a bore 54 for receiving an end 56 of the threaded shaft 48. The threaded shaft 48 also has a notch 58 for receiving a pin 60 for securing the sleeve 52 to the threaded shaft 48. The notch 58 permits a small amount of relative movement between the threaded shaft 48 and sleeve 52. A spring 62 may also be provided in the bore 54 of the sleeve to press against the end 56 of the threaded shaft 48.

The bar 44 is provided with a threaded bore 64 for receiving the threaded shaft 48 of the screwing mechanism 46. Connecting rod 22 is provided with a countersunk hole 66 for receiving one end 68 of the sleeve 52. To assemble the screwing mechanism, the knob 50 is screwed onto the threaded shaft 48 which in turn is screwed through the threaded bore 64 of the bar 44. The sleeve 52 is then placed over the end of the threaded shaft 48 and the pin 60 is inserted through the sleeve and into the notch 58 of the threaded shaft. The threaded shaft 48 is then further screwed through the bore 64 until the end 68 of the sleeve 52 engages the countersunk hole 66 of the connecting rod 22.

In operation, pressure in the nip 40 is increased by turning the knob 50 to cause the bar 44 to ride up the threaded shaft 48. Thus, the bar 44 acts as a lever causing the rocker arms 20 to rotate clockwise about pivot rod 42, moving the second roller 14 closer to the first roller 12 and increasing pressure in the nip. To relieve the pressure in the nip, the knob 50 is turned in the opposite direction.

To prevent heat damage to the polyurethane cover 24 of the second roller 14, it is desirable that the first roller 12 be fully disengaged from the second roller 14 when the apparatus is not in operation. To fully relieve the pressure in the nip, the knob is turned until the sleeve may be released by an operator from the countersunk hole. The spring 62 may be used to permit the screwing mechanism to be more easily engaged and disengaged from the countersunk hole due to movement of the sleeve 52 relative to the threaded shaft 48 (see FIGS. 8A and 8B).

To process a particular length of abrasion panel/fiber optic ribbon, one end of the panel/fiber optic ribbon is inserted into the nip. As the panel/fiber optic ribbon passes through the nip, the screw mechanism is manually adjusted to increase or decrease the pressure in the nip. For example, if a 0.02 inch panel/fiber optic ribbon is intended to be used with a single light source, then the gap between the first roller and second roller may be initially set at 0.006 inches and progressively widened to 0.010 inches as the panel/fiber optic ribbon passes through the nip. This will result in the panel/fiber optic ribbon having greater processing at the end that passed through the nip first. If two light sources are to be used with the ribbon, one at each end, the operator of the apparatus will insert the panel/fiber optic ribbon into the nip under low pressure, gradually increase the pressure until the middle of the panel/fiber optic ribbon is in the nip and then gradually decrease the pressure until processing of the panel/fiber optic ribbon is completed. Of course, the screw mechanism may be automated and/or programmable to obtain any pressure variation in the nip desired. Other variations in processing patterns may be made by placing only a portion of the panel/fiber optic ribbon through the nip or by moving the panel/fiber optic ribbon back and forth in the nip. A second set of non-processing rollers (not shown) may be used to keep pulling the panel/fiber optic ribbon through the apparatus when the first set of rollers 12, 14 is open.

Figure 9:
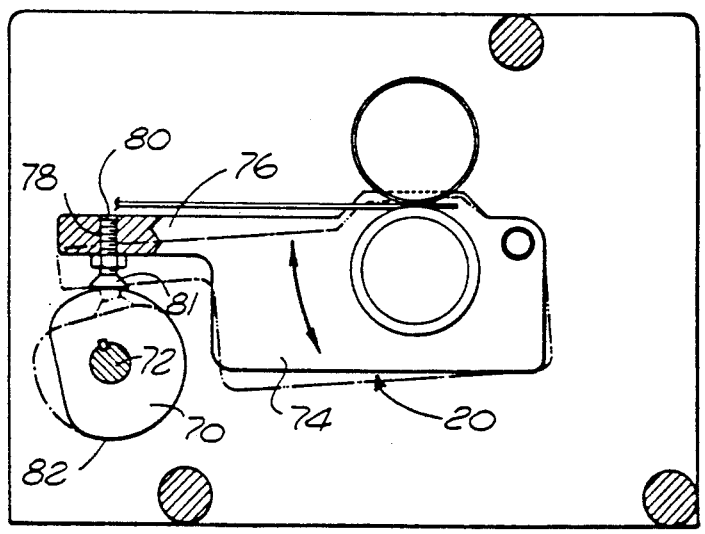
FIG. 9 is a cross-sectional side elevational view of a second preferred embodiment of the complete roller system according to the present invention.
Figure 10:
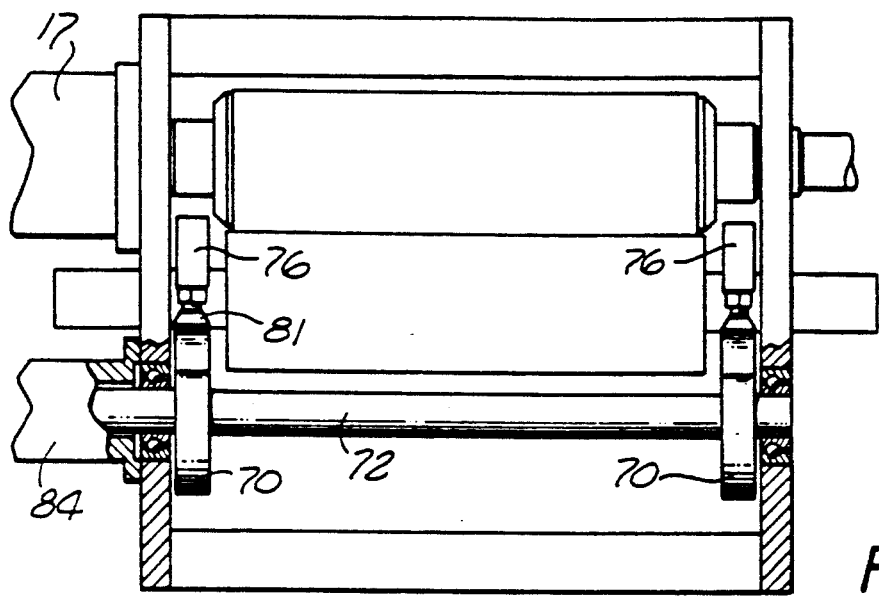
FIG. 10 is a cross-sectional front elevational view of the complete roller system depicted in FIG. 9.

Referring to FIGS. 9 and 10, a second preferred embodiment for altering the pressure in the nip comprises at least one cam wheel 70 mounted on a camshaft 72 (two cam wheels are depicted in FIG. 10). An adjustable speed motor 84 is operatively connected to the camshaft 72. The rocker arms 20 in this embodiment each have a main portion 74 and an extension 76 that extends above each cam wheel 70. Each extension 76 also has a bore 78 for receiving an adjustment screw 80 having a stop 81 for setting the distance between the cam wheel 70 and the rocker arm 20. The surface 82 of the cam wheel may be profiled to impart any desired pattern onto a ribbon passing through the nip. Adjusting the speed of the cam wheel permits the same processing pattern to be applied to different length ribbons. In FIG. 9, the rocker arm is shown, in phantom, in the disengaged position, i.e., the rocker arm is rotated sufficiently counterclockwise such that the bottom roller is release from the top roller.

Figure 11:
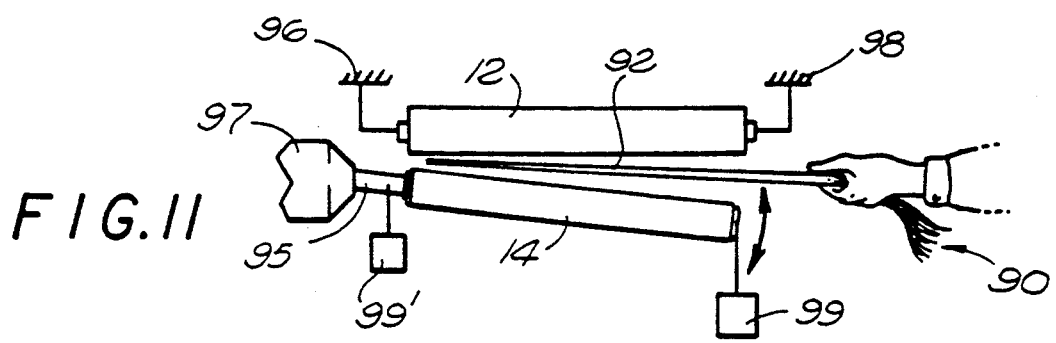
FIG. 11 is a schematic front elevational view of a second alternative embodiment of the rollers.

Referring to FIG. 11, a second alternative embodiment of the processing apparatus is shown in schematic form wherein the first roller 12 is horizontal and the second roller 14 is pivotable vertically about one end. Pressure in the nip will increase or decrease from one end of the rollers to the other depending upon the angle between the rollers. Alternatively, the first roller 12 or both rollers may be pivotable at one or both ends. The first roller 12 may be rotatably supported from above by supports 96, 98, e.g., by a structural frame or cantilevered beam (not shown). The second roller 14 is supported at one end through a flex joint 97 that permits rotation. The other end of the second roller 12 is supported by a hydraulic, pneumatic or other lift device 99 that can raise or lower the second roller, thus adjusting the angle between the rollers. Alternatively, the second roller 14 may be cantilevered. In this case, a lift device 99' may be placed on the shaft 95 of the roller near the flex joint 97. To provide suitable leverage, the shaft 95 may be lengthened.

In this embodiment, it is preferable to insert the panel/fiber optic ribbon, sideways through the nip. In this manner, the full length of the panel/fiber optic ribbon may be processed at one time. In particular, panel/fiber optic ribbons often have a tail 90 at one end comprised of bound or unbound portions of optical fibers that need not be marred. An operator 88 (or supporting equipment) holds the tail 90 of the panel/fiber optic ribbon and manually feeds the portion 92 of the panel/fiber optic ribbon to be processed sideways between the rollers (the direction of movement of the panel/fiber optic ribbon is into the paper in FIG. 9). This apparatus and procedure creates a processing pattern that gradually increases or decreases in intensity along the length of the panel/fiber optic ribbon without the need for continuously adjusting the nip pressure as the panel/fiber optic ribbon is passed through the nip.

Alternatively, the abrasion selection panel may be secured to one of the rollers, and only the fiber optic ribbon passed through the nip. Further, the surface of one of the rollers may itself be coated with discrete areas of abrasion material, such as by adhesively securing diamond dust to areas of the roller.

Figure 12:
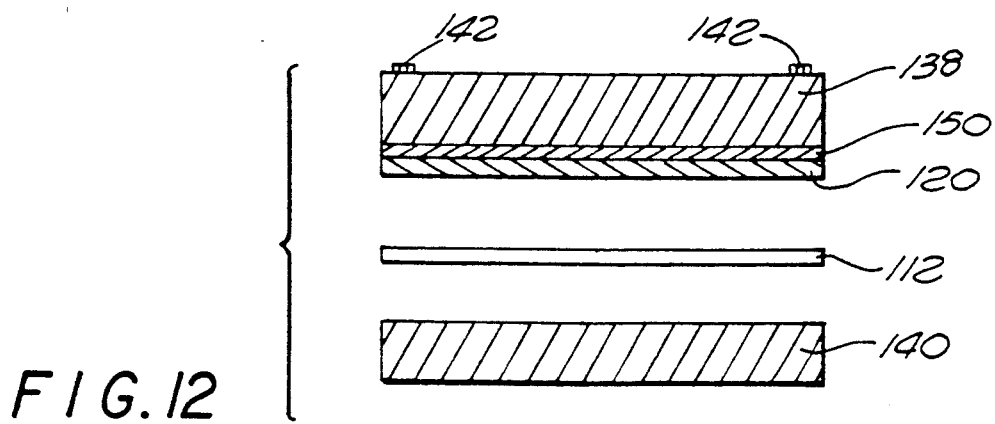
FIG. 12 is a side view of an alternative system for preparing abrasion fiber optic ribbon, using plates in accordance with the present invention.

In an alternative embodiment, as shown in FIG. 12, instead of the use of the roller system, a press plate system is used. After the flat abrasion selection panel 120 with the specific pattern has been prepared, it is secured to a backing pad 150 for support. The panel and pad are then attached to a first pressing plate 138 by attaching means 142, such as screws or bolts. The fiber optic ribbon 112, resting on a second pressing plate 140 is then brought in direct contact with the panel/pad, attaching to the first plate, by driving means (not shown). As the first and second pressing plates come in close contact, the pattern on the panel 120 is pressed onto the fiber optic ribbon. The driving means is reversed to separate the plates after the pressing is completed. The panel/pad is then removed from the plate and separated from each other.

The following non-limiting example further illustrates the present invention. The measurement generally involves measuring the light intensity in units of foot lamberts transmitted through selected locations of a panel such as a rubber keypad.

EXAMPLE 1

Figure 13A:
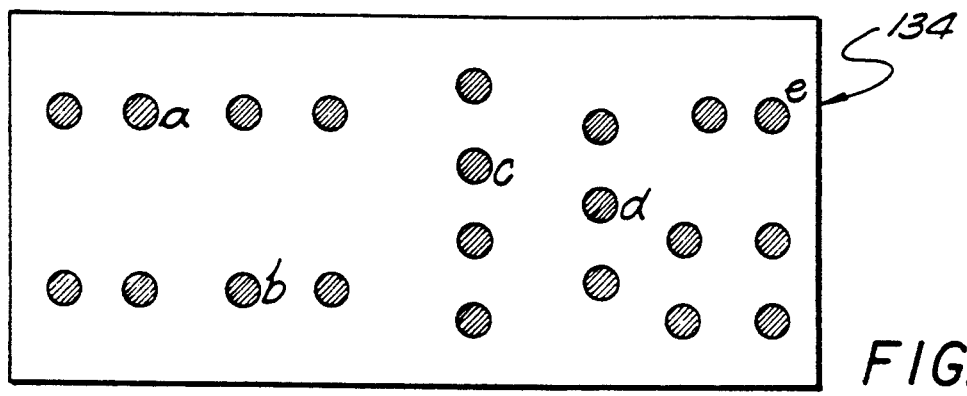
FIG. 13A and 13B are backlight panels for a rubber keypad formed by a prior method and by the system in accordance with the present invention, respectively.
Figure 13B:
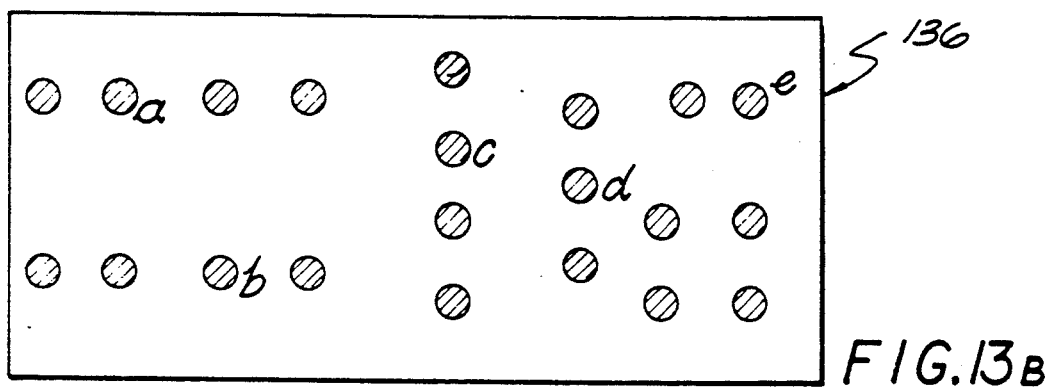

Referring to FIGS. 13A and 13B, two backlit panels for a rubber keypad are prepared for comparison, panel 134 is prepared by using the nip method described earlier in the specification and the second panel 136 is prepared using the present system and method by means of an abrasion selection panel/fiber optic ribbon combination. Each panel 134 and 136 comprises an opaque layer having holes cut through to allow areas a–e of the underlying abraded fiber ribbon to show through. Light intensities transmitted through a number of selected locations (a–e) were then measured. Table 1 below summarizes the result of the light intensity comparison. From Table 1, the results show that to cover all of the keys (13¾ sq. in.) of the rubber keypad, the nip method requires a 6⅞"×2" active illuminated area. The actual area that required illumination is just one square inch.

Using the panel/fiber optic ribbon system and method of the present invention, an average gain of about 400% was obtained. Only the selected areas a-e to show through the opaque layer are abraded.

TABLE 1

Results of light illuminating intensity comparison between panels prepared by the nip method and the present invention.

| Location on Rubber Keypad | Light Intensity (foot - Lamberts) | | | |
|---|---|---|---|---|
| | Nip Method | | Present Invention | |
| | 1st | 2nd | 1st | 2nd |
| a | 0.2 | 0.18 | 1.24 | 1.15 |
| b | 0.18 | 0.17 | 1.14 | 1.13 |
| c | 0.31 | 0.29 | 1.58 | 1.37 |
| d | 0.31 | 0.29 | 1.33 | 1.12 |
| e | 0.35 | 0.30 | 0.78 | 0.72 |

Figure 14:
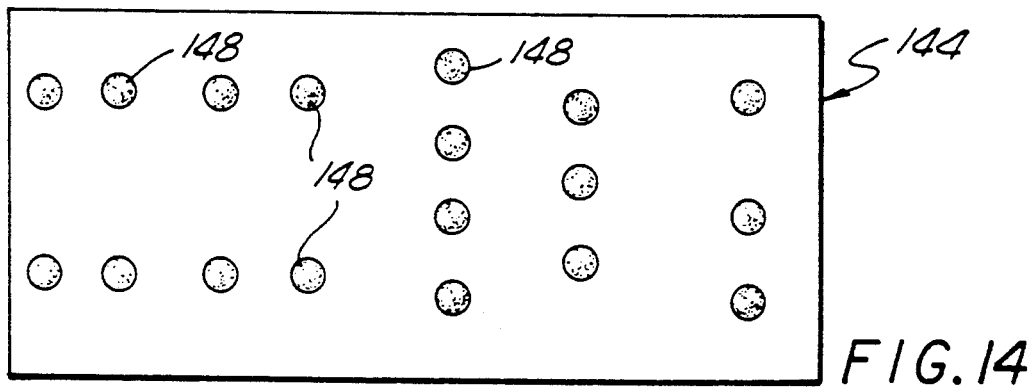
FIG. 14 is a plan view of an alternative embodiment of the abrasion selection panel of the present invention.

FIG. 14 shows an abrasion selection panel substrate 144 used to make the backlit panel 136 of FIG. 13B. In this figure, the areas 148 are raised abrasion areas of emery paper or the like which, when pressed against a fiber optic ribbon, create discrete abraded areas such as are shown in FIG. 13B. The pressing of the abrasion panel against a fiber ribbon may be by the nip method, the press plates, or any other method.

Figure 15A:
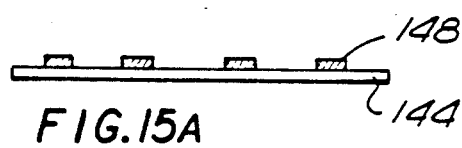
FIGS. 15A–C are cross-sectional, elevational views of three different alternative embodiments of the abrasion selection panel of the present invention.

FIG. 15A shows a cross-section of a portion of FIG. 14. The raised abrasion layers 148 are secure to the panel substrate 144 by adhesive or the like.

Figure 15B:
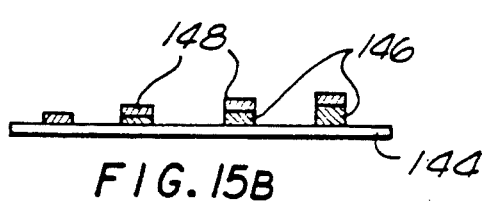

FIG. 15B shows an abrasion panel substrate 144 and raised abrasion areas 148 which are of various heights. These heights are determined by interposing varying thicknesses of shimstock 146 to yield a variation in the amount of pressure applied to the fiber ribbon. This in turn will vary the amount of light to exit through the respective abraded areas on the fiber ribbon.

Figure 15C:
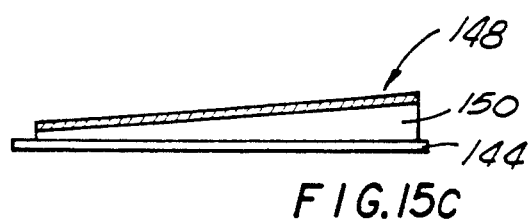

FIG. 15C shows a wedge 150 interposed between the abrasion panel substrate 144 and a layer of abrading material 148. Of course, the wedge 150 may be of various shapes, and the abrasion layer 148 may be built up or cut out to form various designs. In the nip method using this structure, the nip width is set to accommodate the extra thickness of the wedge abrasion panel/fiber optic ribbon and to pass the panel and ribbon through the nip without any further adjustment to the screw mechanism. This eliminates the need to progressively adjust the nip width while processing. The advantage of this method is that the variation of pressure through the nip is set once and the wedge creates the pressure variation on the panel rather than relying on several moving parts that are required to repeat themselves with great accuracy over many cycles.

Those skilled in the art will fully appreciate that the present embodiment shown and desirable to illustrate the present invention is exemplary only and that the same principles may be employed in providing system and method for preparing abrasion selection panel. It will be further appreciated that various other minor modifications or changes, particularly with respects to details of component construction and procedural steps, might be made without departing from the gist and essence of the invention. Accordingly, it should be interpreted as encompassing all component constructions fairly regardable as functional equivalents of the subject matter to which claims are directed.

Having described the invention, what I claim and desire to secure by letter patent is:

1. A system for prepared abraded fiber optic ribbon, comprising:

an abrasion selection panel containing a design, said panel being positioned for direct contact with said ribbon;

variable pressing means for pressing said panel and said ribbon together so that the panel and pressing means combine to produce the design of said panel on the ribbon; and means for driving said pressing means to feed and press said panel and said ribbon so that the panel and pressing means combine to produce the design of said panel on the ribbon.

2. The system for preparing an abraded fiber optic ribbon of claim 1, further comprising a laser engraved panel on emery paper.

3. The system for preparing an abraded fiber optic ribbon of claim 2, wherein said emery paper is adhered to a thin substrate for support.

4. The system for preparing an abraded fiber optic ribbon of claim 1, wherein further said pressing means comprises a first roller and a second roller defining a nip through which said panel and said ribbon are being fed and pressed against each other.

5. The system for preparing an abraded fiber optic ribbon of claim 4, further comprising means for gradually adjusting the pressure in the nip to obtain a predetermined varying pattern along a length of said fiber optic ribbon.

6. The system for preparing an abraded fiber optic ribbon of claim 1, wherein said driving means has adjustable speeds.

7. The system for preparing an abraded fiber optic ribbon of claim 4, wherein further said first roller has a smooth surface.

8. The system for preparing an abraded fiber optic ribbon of claim 7, wherein further said second roller has a smooth surface.

9. The system for preparing an abraded fiber optic ribbon of claim 8, wherein further said second roller has a deformable cover.

10. The system for preparing an abraded fiber optic ribbon of claim 4, further comprising means for heating at least one of said first or second rollers.

11. The system for preparing an abraded fiber optic ribbon of claim 4, further comprising a second pair of rollers for drawing said panel and said fiber optic ribbon through said system when said first roller and said second roller are not in engagement with said fiber optic ribbon.

12. A system for preparing an abraded fiber optic ribbon containing parallel optic fibers adhered to a flat reflective backing, comprising:

an abrasion selection panel containing a design prepared by laser engraving on emery paper adhered to a thin substrate, said panel being positioned for direct contact with said ribbon;

a first and a second roller defining a nip through which said panel and said ribbon are to be fed;

variable means for pressing the rollers against each other whereby the panel and pressing means combine to produce the design of the panel on the ribbon;

means for driving at least one of said rollers at an adjustable speed; and means for heating at least one of said rollers.

13. The system for preparing an abraded fiber optic ribbon of claim 1, wherein said pressing means comprises a first plate and a second plate defining a pressing zone in which said panel and said ribbon are fed and pressed against each other.

14. The system for preparing an abraded fiber optic ribbon of claim 13 wherein said panel is attached to a backing pad for support.

15. The system for preparing an abraded fiber optic ribbon of claim 13, wherein further shimstock of variable thickness is secured between said backing pad and said first plate, whereby upon pressing, a predetermined pattern along a length of said ribbon is obtained due to different pressure being applied to said length of said ribbon.

16. The system for preparing an abraded fiber optic ribbon of claim 14, wherein a wedge with a constant sloping thickness is secured between said backing pad and said first plate, whereby upon pressing, a predetermined pattern along a length of said ribbon is obtained due to uniform differential pressure being applied to said length of said ribbon.

17. The system for preparing an abraded fiber optic ribbon of claim 15, further comprising means for heating at least one of said first and second plates.

18. A system for preparing an abraded fiber optic ribbon containing parallel optic fibers adhered to a flat plastic backing, comprising:
   an abrasion selection panel containing a design prepared by laser engraving on emery paper adhered to a backing support pad, said panel in direct contact with said ribbon;
   a first and a second plate with smooth surfaces defining a pressing zone in which said panel and said ribbon are to be fed;
   variable means for pressing the plates against each other, whereby the panel and pressing means combine to produce the design of the panel on the ribbon;
   means for driving at least one of said plates at an adjustable speed; and
   means for heating at least one of said plates.

19. A method for preparing an abraded fiber optic ribbon comprising the steps of:
   preparing an abrasion selection panel containing a design;
   contacting said panel with a fiber optic ribbon;
   feeding and variably pressing said panel and said fiber optic ribbon through a processing means as said design is being processed onto said fiber optic ribbon;
   driving said processing means to feed said panel and said fiber optic ribbon; and
   separating said panel from said fiber optic ribbon after said specific design has been processed onto said fiber optic ribbon to produce varying abrasion on the ribbon.

20. The method for preparing an abraded fiber optic ribbon of claim 19, further comprising the step of adjusting the pressure in the processing means to obtain a predetermined varying pattern along the length of said fiber optic ribbon.

21. The method for preparing an abraded fiber optic ribbon of claim 19, further comprising the step of heating at least one of said processing means before feeding said panel and said fiber optic ribbon into said processing means.

22. A method for preparing an abraded fiber optic ribbon comprising the steps of:
   preparing an abrasion selection panel containing a design;
   contacting said panel with a fiber optic ribbon;
   feeding and variably pressing said panel and said fiber optic ribbon through a nip defined by a first roller and a second roller as said design is being pressed onto said fiber optic ribbon to produce a varying abrasion on said panel;
   driving at least one of said rollers to feed said panel and said fiber optic ribbon; and
   separating said panel from said fiber optic ribbon after said specific design has been processed onto said fiber optic ribbon.

23. The method for preparing an abraded fiber optic ribbon of claim 22, further comprising the step of creating a pressure differential in the nip along the length of said first and second roller.

24. The method for preparing an abraded fiber optic ribbon of claim 22, wherein the pressure differential is created by applying greater pressure in the nip at one end of said first and second rollers than at the other end.

25. The method for preparing an abraded fiber optic ribbon of claim 22, wherein said panel and said fiber optic ribbon are fed sideways between said first and second rollers.

26. A method for preparing an abraded fiber optic ribbon comprising the steps of:
   preparing an abrasion selection panel containing a design;
   contacting said panel with a fiber optic ribbon;
   feeding and variably pressing said panel and said fiber optic ribbon into a pressing zone defined by a first plate and a second plate as said design is being pressed onto said fiber optic ribbon;
   driving at least one of said plates to feed said panel and said fiber optic ribbons; and
   separating said panel from said fiber optic ribbons after said design has been pressed onto said fiber optic ribbon.

27. A method for preparing an abraded fiber optic ribbon of claim 26, further comprising:
   the step of attaching said panel to a backing pad for support.

28. A method for preparing an abraded fiber optic ribbon of claim 27, further comprising the step of placing shimstock of variable thickness between said pad and said ribbon prior to pressing to obtain a predetermined pattern along a length of said ribbon.

29. A method for preparing an abraded fiber optic ribbon of claim 27, further comprising the steps of placing a wedge with a constant sloping thickness between said pad and said ribbon prior to pressing to obtain a predetermined pattern along a length of said ribbon.

30. The method for preparing an abraded fiber optic ribbon of claim 22 wherein panels more than one inch wide are used.

* * * * *